Aug. 24, 1948.  G. A. CASWELL  2,447,635
SHAKE-DOWN DEVICE FOR THERMOMETERS
Filed March 19, 1947
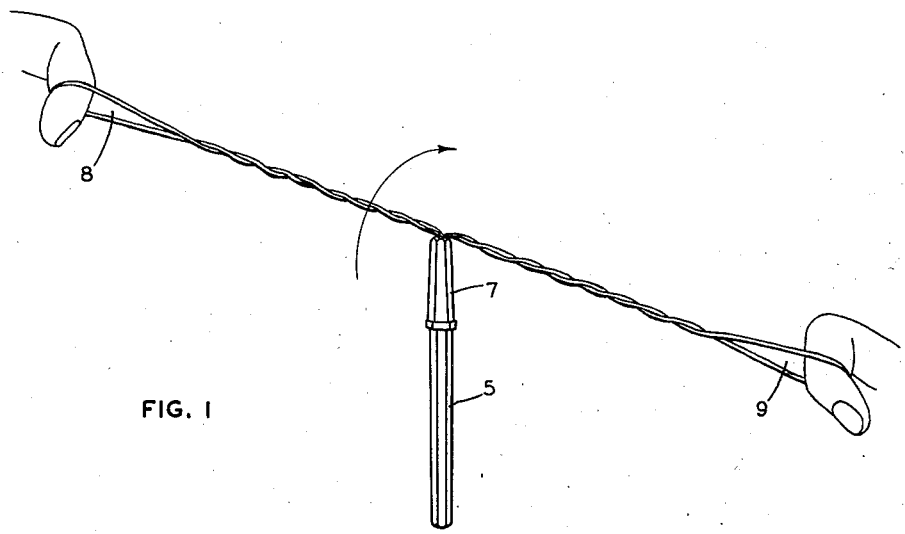
FIG. 1
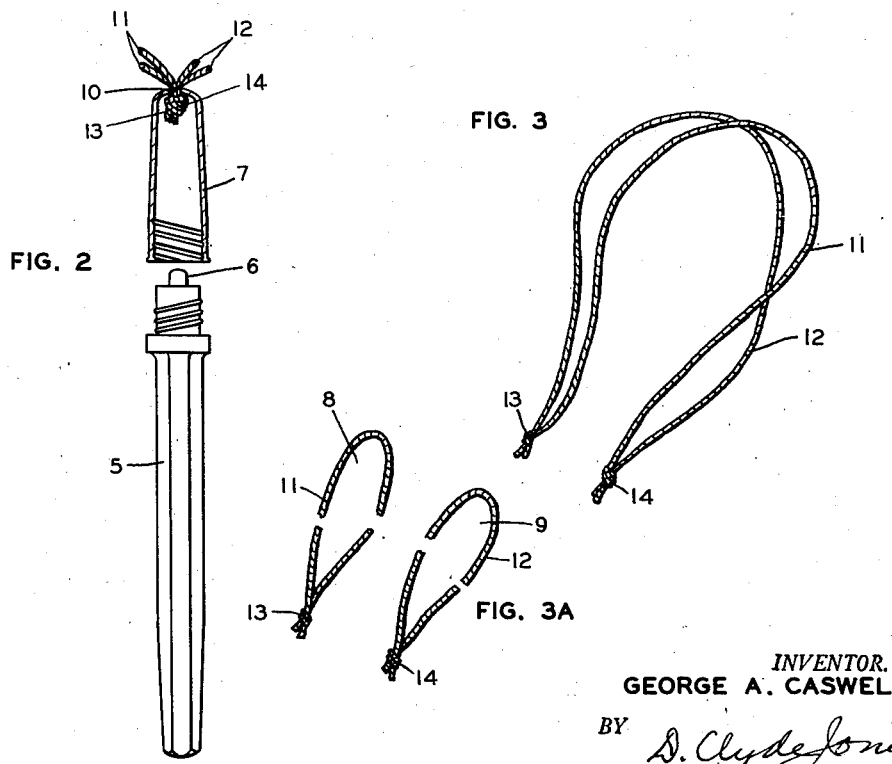
FIG. 2
FIG. 3
FIG. 3A
INVENTOR.
GEORGE A. CASWELL
BY D. Clyde Jones
ATTORNEY Patented Aug. 24, 1948

2,447,635

UNITED STATES PATENT OFFICE 2,447,635

SHAKEDOWN DEVICE FOR THERMOMETERS

George A. Caswell, Rochester, N. Y., assignor to Taylor Instrument Companies, Rochester, N. Y., a corporation of New York Application March 19, 1947, Serial No. 735,633

3 Claims. (Cl. 73—373)

1

This invention relates to a shake-down device for use with a self-registering thermometer.

Self-registering thermometers and particularly those used as fever thermometers, must have their mercury indicating columns restored to a reading lower than a given minimum value, before each succeeding use. Currently the user restores the mercury column of a fever thermometer by grasping the upper end of the stem thereof between his thumb and forefinger. Then he shakes the thermometer smartly so that some of the mercury in the thermometer stem is forced past the contraction into the thermometer bulb. Many individuals find it difficult to shake down the usual fever thermometer and when the thermometer is of the type referred to as a "hard shaker," resulting from improper fabrication, many persons are unable to shake down the indicating mercury column thereof.

Various arrangements have been suggested for shaking down a fever thermometer, but all of them have failed to receive wide acceptance due to some or all of the following factors such as lack of reliability, complexity or high cost of manufacture.

The shake down device of the present invention has for its purpose a relatively simple and inexpensive construction which provides a high degree of effectiveness.

The invention will best be understood by reference to the description and claims when taken with the drawings in which:

Fig. 1 is a perspective view of the shake down device of the present invention indicating the manner in which it is used;

Fig. 2 is a front view of a thermometer case with a fever thermometer therein and a cap therefor with a part of the cap broken away to illustrate how the shake down loops (shown only in part) are fastened in the cap; and Fig. 3 is a perspective view of the shake down loops before assembly into the cap, while Fig. 3A shows other loops.

The shake down device of this invention includes a case 5 of suitable size to receive a self-registering thermometer 6. The open end of the thermometer case is closed by a cap 7, the case and the cap having interengaging portions thereon, such as screw threads, to lock these parts detachably together. The cap has secured to the closed end thereof, two flexible loops 8 and 9. Specifically, the closed end of the cap has an opening 10 provided therein. Two pieces of cord 11 and 12 or like flexible material are tied together to form an endless piece, by knotting

2 their respective ends together as indicated at 13 and 14. The pieces of cord between the knots 13 and 14 are inserted into the open end of the cap and are then drawn through the opening 10 in the cap until the knots are lodged against the inner surface of the cap. The portions of the cords that are drawn through the cap, form the loops 8 and 9.

When it is desired to shake down a thermometer, such as 6, it is inserted in the case 5. The cap 7 is then screwed on the case. The user next inserts a finger of one hand into the loop 8 and a finger of his other hand into the loop 9. Thereafter, the user moves his arms in spaced relation to swing the thermometer and its case in a circle until the cords at each side of each loop are tightly twisted on each other with the result that each loop is shortened. Next, the user quickly draws his hands apart thereby causing the case with the thermometer therein to spin while untwisting. This spinning of the thermometer causes some of the mercury column in the indicating portion of the thermometer stem to be forced by centrifugal action into the thermometer bulb until the height of the remaining mercury column is below the minimum desired value.

A modified form of the invention is shown in Fig. 3A wherein one piece of cord 11 has its ends knotted together as indicated at 13, while the other piece of cord 12 has its ends knotted together as shown at 14. The resulting loops 8 and 9 are in the cap 7 in the manner previously indicated.

The present disclosure sets forth the preferred forms of the invention but it will be understood that each loop can be replaced by a piece of cord fastened to the cap, the two pieces of cord being manipulated in like manner as the mentioned loops.

What I claim is:

1. In a shake-down device for a self-registering thermometer, a case having an open end for receiving a thermometer, a cap detachably secured to the open end of said case to close the same, said cap having a perforation therein in the extremity of the closed end thereof, and a pair of flexible loops retained in said cap and extending through said perforation.

2. In a shake-down device for a self-registering thermometer, a case having an open end for receiving a thermometer, a cap detachably secured to the open end of said case to close the same, said cap having a perforation therein in the extremity of the closed end thereof, and two pieces of cord knotted together to form a continuous piece, the parts of the cord between the knots extending through said perforation with the knots engaging the inside of said cap.

3. In a shake-down device for a self-registering thermometer, a case having an open end for receiving a thermometer, a cap detachably secured to the open end of said case to close the same, said cap having a perforation therein in the extremity of the closed end thereof, and two pieces of cord, each piece having its ends knotted together to form a loop, the resulting loops being drawn through said perforation with said knots engaging the inside of said cap.

GEORGE A. CASWELL.

REFERENCES CITED

The following references are of record in the file of this patent:

UNITED STATES PATENTS

| Number | Name | Date |
|---|---|---|
| 723,355 | Ashenberger | Mar. 24, 1903 |
| 780,315 | Wetherill | Jan. 17, 1905 |
| 1,651,490 | Walker | Dec. 6, 1927 |
| 1,929,696 | Kashiwagi | Oct. 10, 1933 |

FOREIGN PATENTS

| Number | Country | Date |
|---|---|---|
| 5,535 | Great Britain | Mar. 8, 1909 |